US011222334B2

(12) United States Patent
Sharma et al.

(10) Patent No.: US 11,222,334 B2
(45) Date of Patent: Jan. 11, 2022

(54) PROCESSING ELECTRONIC PAYMENTS ON A MOBILE COMPUTER DEVICE

(71) Applicant: MASTERCARD INTERNATIONAL INCORPORATED, Purchase, NY (US)

(72) Inventors: Piyush Sharma, Maharashtra (IN); Elson Rodrigues, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 933 days.

(21) Appl. No.: 15/829,307

(22) Filed: Dec. 1, 2017

(65) Prior Publication Data

US 2018/0165680 A1 Jun. 14, 2018
US 2019/0026741 A9 Jan. 24, 2019

(30) Foreign Application Priority Data

Dec. 14, 2016 (SG) .......................... 10201610472X

(51) Int. Cl.
*G06Q 40/00* (2012.01)
*G06Q 20/40* (2012.01)
(Continued)

(52) U.S. Cl.
CPC ......... *G06Q 20/4014* (2013.01); *G06Q 20/02* (2013.01); *G06Q 20/027* (2013.01);
(Continued)

(58) Field of Classification Search
None
See application file for complete search history.

(56) References Cited

U.S. PATENT DOCUMENTS 7,657,463 B1 * 2/2010 Shaw ................. G06Q 30/0601
 705/26.1
8,095,113 B2 1/2012 Kean et al.
(Continued)

FOREIGN PATENT DOCUMENTS

WO WO-2009052196 A1 * 4/2009 ............. G06F 21/31
WO WO-2011119463 A2 * 9/2011 ....... G06Q 20/38215
WO WO-2012150585 A2 * 11/2012 ............. G06Q 40/08

OTHER PUBLICATIONS

Lacmanovic et al., "Contactless payment systems based on RFID Technology," MPIRO, May 24-28, 2010, Opatija, Croatia. 2010 (Year: 2010).*

(Continued)

*Primary Examiner* — Alexander G Kalinowski
*Assistant Examiner* — William B. Bunker
(74) *Attorney, Agent, or Firm* — Pillsbury Winthrop Shaw Pittman LLP

(57) ABSTRACT

A device for processing electronic payments for the purchase of goods or services is provided. The device includes one or more computer processors in communication with non-transitory computer readable data storage and a display. The data storage includes instructions stored thereon that, when executed by the one or more processors, cause the device to execute a transaction process including receiving purchase data representing one or more goods or services to be purchased, receiving user input to effect a payment transaction, determining a total transaction amount from the purchase data, reading payment credentials from a purchaser's payment device, sending a payment request, receiving data representing a received one time password (OTP), sending the received OTP to the third party authorization server for authentication against a OTP sent by the third party authorization server to a mobile device, and receiving (Continued)

data representing successful authentication from the third party authorization server.

14 Claims, 10 Drawing Sheets

(51) Int. Cl.
    *G06Q 20/32*     (2012.01)
    *G06Q 20/34*     (2012.01)
    *G06Q 20/38*     (2012.01)
    *G06Q 30/06*     (2012.01)
    *H04L 9/32*     (2006.01)
    *H04L 29/06*     (2006.01)
    *G06Q 20/02*     (2012.01)

(52) U.S. Cl.
    CPC ....... *G06Q 20/3223* (2013.01); *G06Q 20/352* (2013.01); *G06Q 20/382* (2013.01); *G06Q 20/385* (2013.01); *G06Q 20/3821* (2013.01); *G06Q 20/4093* (2013.01); *G06Q 30/06* (2013.01); *H04L 9/32* (2013.01); *H04L 9/3228* (2013.01); *H04L 63/0428* (2013.01); *H04L 2209/56* (2013.01)

(56) References Cited

U.S. PATENT DOCUMENTS

| | | | |
|---|---|---|---|
| 8,191,118 B2 | 5/2012 | Kim et al. | |
| 8,565,723 B2 | 10/2013 | Cox | |
| 8,630,907 B2 | 1/2014 | Mardikar et al. | |
| 8,843,757 B2 | 9/2014 | Varadarajan | |
| 9,230,254 B1 | 1/2016 | Sharifi Mehr | |
| 9,477,958 B2 | 10/2016 | Sharifi Mehr | |
| 10,453,050 B1* | 10/2019 | Arumugam | G06Q 20/20 |
| 10,762,542 B2* | 9/2020 | Zhang | G06Q 20/32 |
| 2007/0136140 A1* | 6/2007 | Smith, Jr. | G06Q 30/0639 |
| | | | 705/80 |
| 2008/0103914 A1* | 5/2008 | Hussain | G06Q 10/087 |
| | | | 705/26.1 |
| 2008/0103984 A1* | 5/2008 | Choe | G06Q 20/3821 |
| | | | 705/76 |
| 2008/0208759 A1 | 8/2008 | Royyuru | |
| 2009/0104888 A1* | 4/2009 | Cox | G06Q 20/40 |
| | | | 455/410 |
| 2011/0153496 A1* | 6/2011 | Royyuru | G06Q 20/12 |
| | | | 705/44 |
| 2011/0238473 A1* | 9/2011 | Sankolli | G06Q 30/00 |
| | | | 705/14.23 |
| 2012/0095853 A1* | 4/2012 | von Bose | G06Q 30/0641 |
| | | | 705/16 |
| 2013/0159070 A1* | 6/2013 | Salamone | G06Q 20/3223 |
| | | | 705/13 |
| 2013/0185209 A1* | 7/2013 | Ahn | G06Q 20/3827 |
| | | | 705/44 |
| 2013/0282533 A1* | 10/2013 | Foran-Owens | G06Q 30/0641 |
| | | | 705/27.1 |
| 2014/0122265 A1 | 5/2014 | Mardikar et al. | |
| 2014/0222676 A1* | 8/2014 | Lee | G06Q 20/14 |
| | | | 705/44 |
| 2014/0297362 A1* | 10/2014 | Kumar | G06Q 30/0613 |
| | | | 705/7.29 |
| 2015/0287021 A1* | 10/2015 | Itwaru | G06Q 20/3276 |
| | | | 705/44 |
| 2016/0337126 A1* | 11/2016 | Gawlas | G06Q 20/3276 |
| 2017/0039569 A1 | 2/2017 | Sharifi Mehr | |
| 2017/0091730 A1 | 3/2017 | Gurunathan et al. | |
| 2017/0148009 A1* | 5/2017 | Lafuente | G06Q 20/3821 |
| 2018/0047009 A1* | 2/2018 | Ayyagari | G06Q 20/322 |
| 2018/0121925 A1* | 5/2018 | Gaikar | H04W 4/80 |
| 2020/0234303 A1* | 7/2020 | Arumugam | G07G 1/0036 |

OTHER PUBLICATIONS

Gelogo et al., "Development of Mobile Enterprise Inventory Management System Application with CBD," International Journal of Software Engineering and its Applications, vol. 8, No. 1, pp. 385-396, 2014 (Year: 2014).*

* cited by examiner

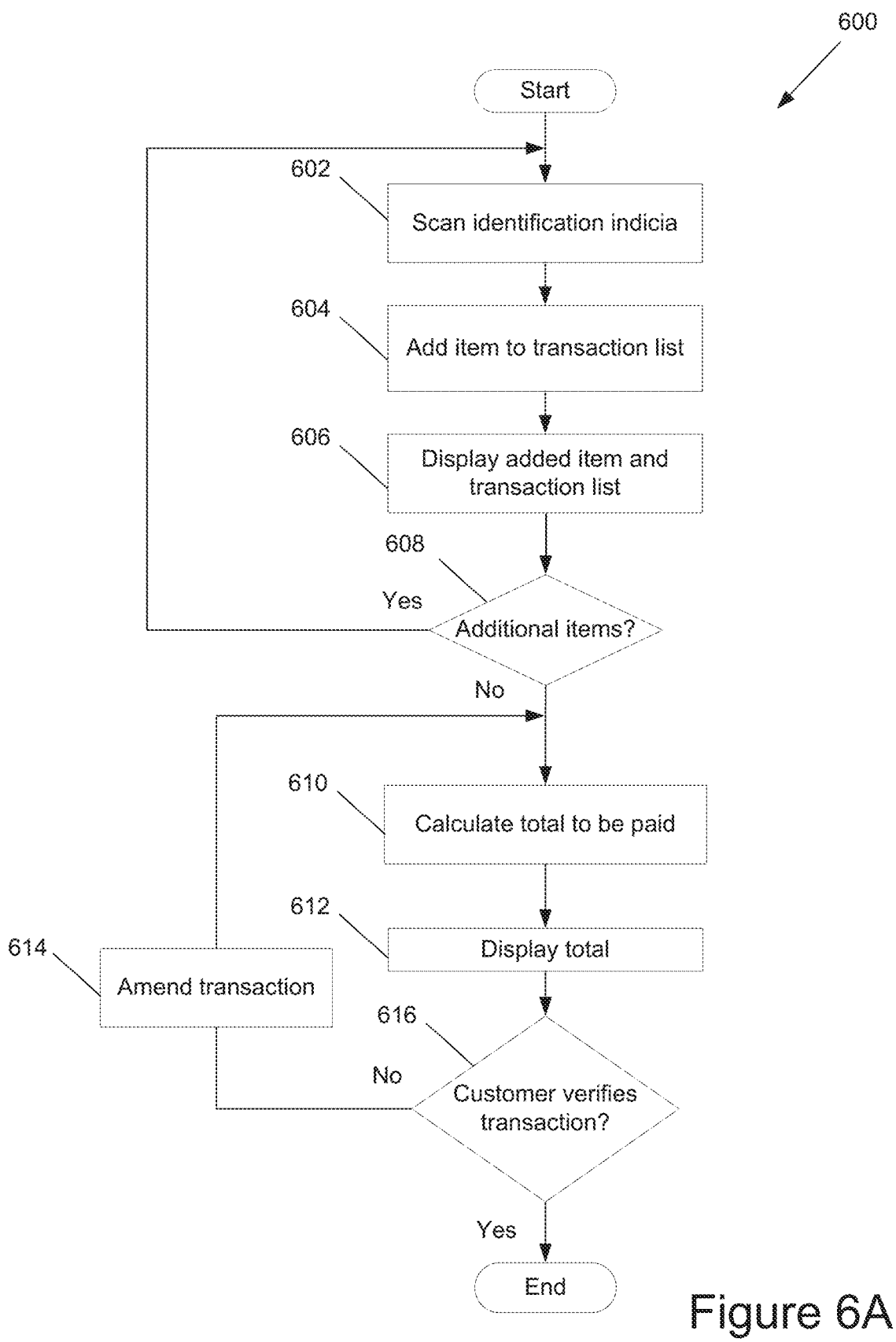

PROCESSING ELECTRONIC PAYMENTS ON A MOBILE COMPUTER DEVICE

CROSS REFERENCE TO RELATED APPLICATIONS

This patent application claims priority to Singapore Application No. 10201610472X filed on Dec. 14, 2016, the disclosure of which is incorporated by reference herein in its entirety as part of the present application.

BACKGROUND

The present disclosure relates to processing of electronic payments on a mobile computer device.

Traditional brick-and-mortar stores typically have a fixed layout which forces a procedural sales experience, whereby:
 (a) customers enter from the storefront;
 (b) pick up items they would like to purchase;
 (c) approach the designated check-out area where their items would be entered into a point of sales (POS) system including, for example, a cash register;
 (d) pays the cashier by cash and receives change (if any); and
 (e) retrieves item(s) and leaves the store via the exit usually placed close to the check-out area.

The fixed layout creates problems with user experience because customers can feel like they are being treated like cattle, being herded around in a defined path to ensure maximum opportunity to purchase items. In addition, it is often the case that the cashiers' desks become bottlenecks where customers are forced to queue, further devaluing the shopping experience for the customer.

The phrase "cash is king" is one typically used in business for highlighting the importance of cash flow. In practice however, cash transactions may often result in a number of issues. For hassle-free cash transactions, merchants have to ensure that they have sufficient cash in a variety of denominations throughout the store's operational hours. For businesses (especially those with high volume or high cash value transactions), this would require a designated secure storage area to securely store the cash e.g. a secure safe. In that regard, good security protocols need to be implemented and observed to mitigate the risk of theft or robbery. Another issue with cash is the cost associated with ensuring proper cash handling including training. Employees may be required to manually tally the cash in till at the end of each shift (possibly multiple times over for increased accuracy) and the cash needs to be securely transferred to a safe or bank. There is also a chance that employees may mishandle or misplace cash.

The issues with cash transactions resulted in a wave of new retail payment systems being introduced to the market. To remain competitive, especially with the rise of online shopping, retailers are constantly under pressure to update their systems to incorporate these new systems resulting in increased costs to both acquire and maintain them. Additionally, with technology constantly improving at a rapid speed, these systems are often phased out and replaced with newer technology. Due to these high costs, retailers are often limited to operating only a small number of systems which may result in longer waiting times for customers. This may ultimately deter customers from returning to the store if they have to wait for an extended period of time to complete a purchase.

Current POS systems are often older systems that have been modified to work in combination with various newer systems. For example,
 (a) a non-computerized cash register which does not include database of inventory;
 (b) a variety of payment systems (magnetic strip credit card reader, EMV chip reader, NFC-enabled reader, and debit card machine);
 (c) a separate computer system or a manual method for maintaining the inventory in the store; and
 (d) an employee management system e.g. for registering employee's time clocking activities and maintaining and creating rosters.

Stores may have implemented these systems separately and incrementally. This may be due to a gradual expansion of the store or the high costs associated with these systems resulting in a slow uptake of new systems. In that regard, these systems may not be unified and as such, do not share data with each other. As a result, the system may be haphazard and inefficient requiring the data to be entered into multiple systems resulting in an increase in employee costs.

Operating a multitude of separate systems results in a large footprint on the cashier's desk. This is a waste of precious retail space which could be valuable to a retailer. Additionally, these systems are cumbersome to move around therefore are positioned in a designated area. This renders the retail space rigid and inflexible.

It is generally desirable to overcome or ameliorate one or more of the above described difficulties, or to at least provide a useful alternative.

BRIEF DESCRIPTION

Certain embodiments of the present disclosure provide a device for processing electronic payments for the purchase of goods or services, the device including one or more computer processors in communication with non-transitory computer readable data storage and a display, the data storage including instructions stored thereon that, when executed by the one or more processors, cause the device to execute a transaction process including:
 (a) receiving purchase data representing one or more goods or services to be purchased;
 (b) receiving user input to effect a payment transaction;
 (c) determining a total transaction amount from the purchase data;
 (d) reading payment credentials from a purchaser's payment device, the payment credentials including a primary account number (PAN) or a payment token;
 (e) sending a payment request, including the payment credentials, to a third party authorization server;
 (f) receiving data representing a received one time password (OTP);
 (g) sending the received OTP to the third party authorization server for authentication against a OTP sent by the third party authorization server to a mobile device registered against the PAN or the payment token; and
 (h) receiving data representing successful authentication from the third party authorization server.

The above-mentioned device further includes a contactless EMV reader component.

The payment request data is encrypted using a unique one-time cryptogram before being transmitted to the third party authorization server.

In accordance with certain embodiments of the disclosure, there is an authorization server for processing electronic payments, the authorization server including one or more computer processors which are configured to:

(a) receive, from a merchant's mobile computer device, payment request data including payment credentials, the payment credentials including a primary account number (PAN) or a payment token;

(b) generate a one time password (OTP);

(c) send the generated OTP to a mobile device registered against the PAN or the payment token;

(d) receive a received OTP from the merchant's mobile computer device;

(e) match the received OTP against the generated OTP; and (f) if the received OTP matches the generated OTP, generate a transaction authorization request from the payment request data.

In accordance with certain embodiments of the disclosure, there is method for processing electronic payments on a merchant's mobile computer device for the purchase of goods or services, the method for execution by one or more computer processors of the mobile computer device in communication with computer readable data storage and a display, including the steps of:

(a) receiving purchase data representing one or more goods or services to be purchased;

(b) receiving user input to effect a payment transaction;

(c) determining a total transaction amount from the purchase data;

(d) reading payment credentials from a purchaser's payment device, the payment credentials including a primary account number (PAN) or a payment token;

(e) sending a payment request, including the payment credentials, to a third party authorization server;

(f) receiving data representing a received one time password (OTP);

(g) sending the received OTP to the third party authorization server for authentication against a OTP sent by the third party authorization server to a mobile device registered against the PAN or the payment token; and (h) receiving data representing successful authentication from the third party authorization server.

In accordance with certain embodiments of the disclosure, there is a method for processing electronic payments on an authorization server, the method including, on one or more computer processors of the authorization server:

(a) receiving, from a merchant's mobile computer device, payment request data including payment credentials, the payment credentials including a primary account number (PAN) or a payment token;

(b) generating a one time password (OTP);

(c) sending the generated OTP to a mobile device registered against the PAN or the payment token;

(d) receiving a received OTP from the merchant's mobile computer device;

(e) matching the received OTP against the generated OTP; and (f) if the received OTP matches the generated OTP, generating a transaction authorization request from the payment request data.

BRIEF DESCRIPTION OF THE DRAWINGS

Certain embodiments of the disclosure are hereafter described, by way of non-limiting example only, with reference to the accompanying drawings, in which:

FIG. 6A is a flowchart diagram showing the POS process in FIG. 4;

DETAILED DESCRIPTION

Figure 1:
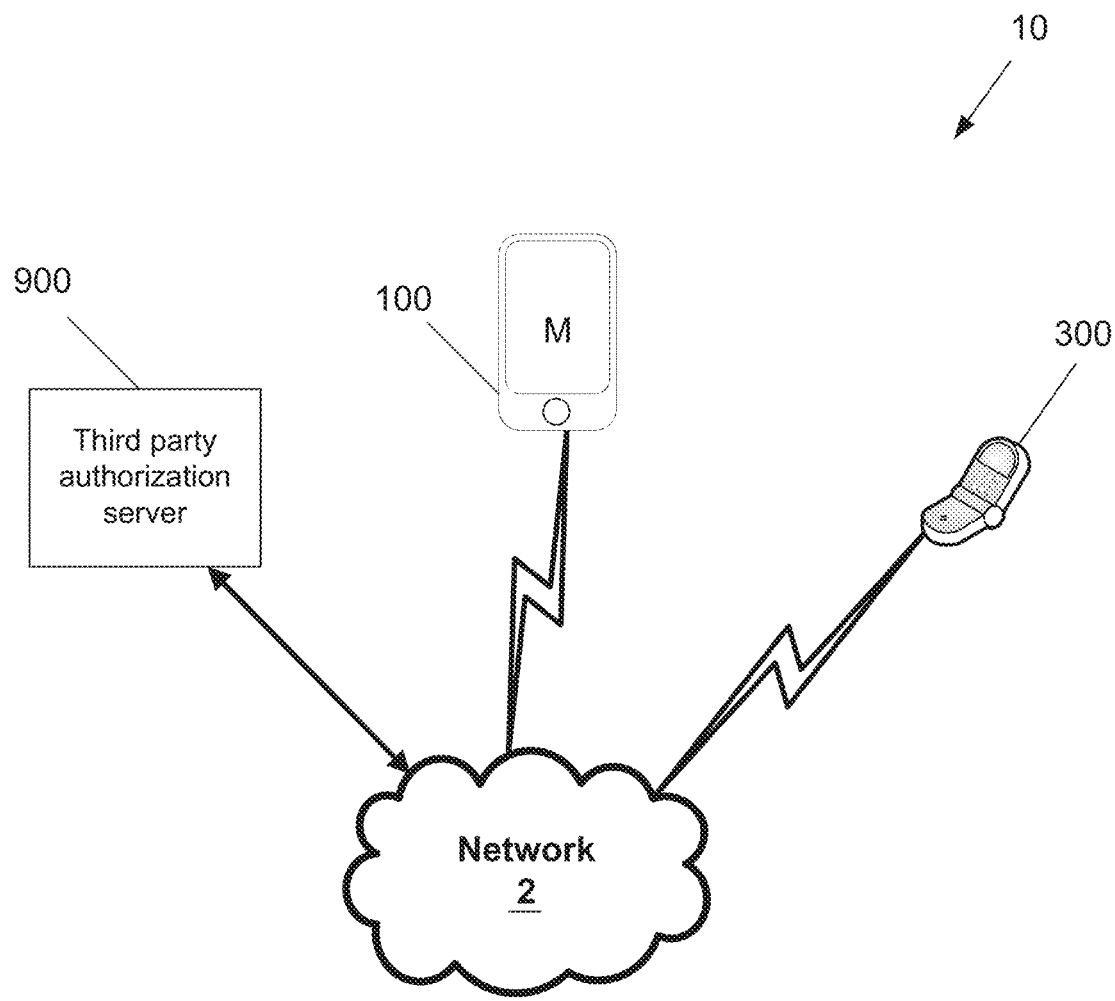
FIG. 1 is a schematic diagram of a system for and a method for adding goods to a merchant's inventory database and a method for processing POS transactions and electronic payments.

The system 10 shown in FIG. 1 is for use in performing at least part of the following:

(a) inventory management, including the ability to add goods to a merchant's inventory database;

(b) processing POS transactions; and (c) processing electronic payments.

The system 10 includes:

(a) a merchant's mobile computer device (MCD) 100;

(b) a purchaser's mobile device 300; and (c) a third party authorization server 900.

The components of system 10 are in communication via network 2. The communications network 2 may include the Internet, telecommunications networks, and/or local area networks.

Advantages are achieved by consolidating one or more of the operations above into one MCD 100. To this end, a merchant may already own a MCD 100 and would not need to acquire new equipment. The system 10 may also allow a merchant to process POS payments and effect electronic transactions from practically anywhere within the store, or otherwise, that has access to network 2.

Mobile Computer Device 100

Figure 2:
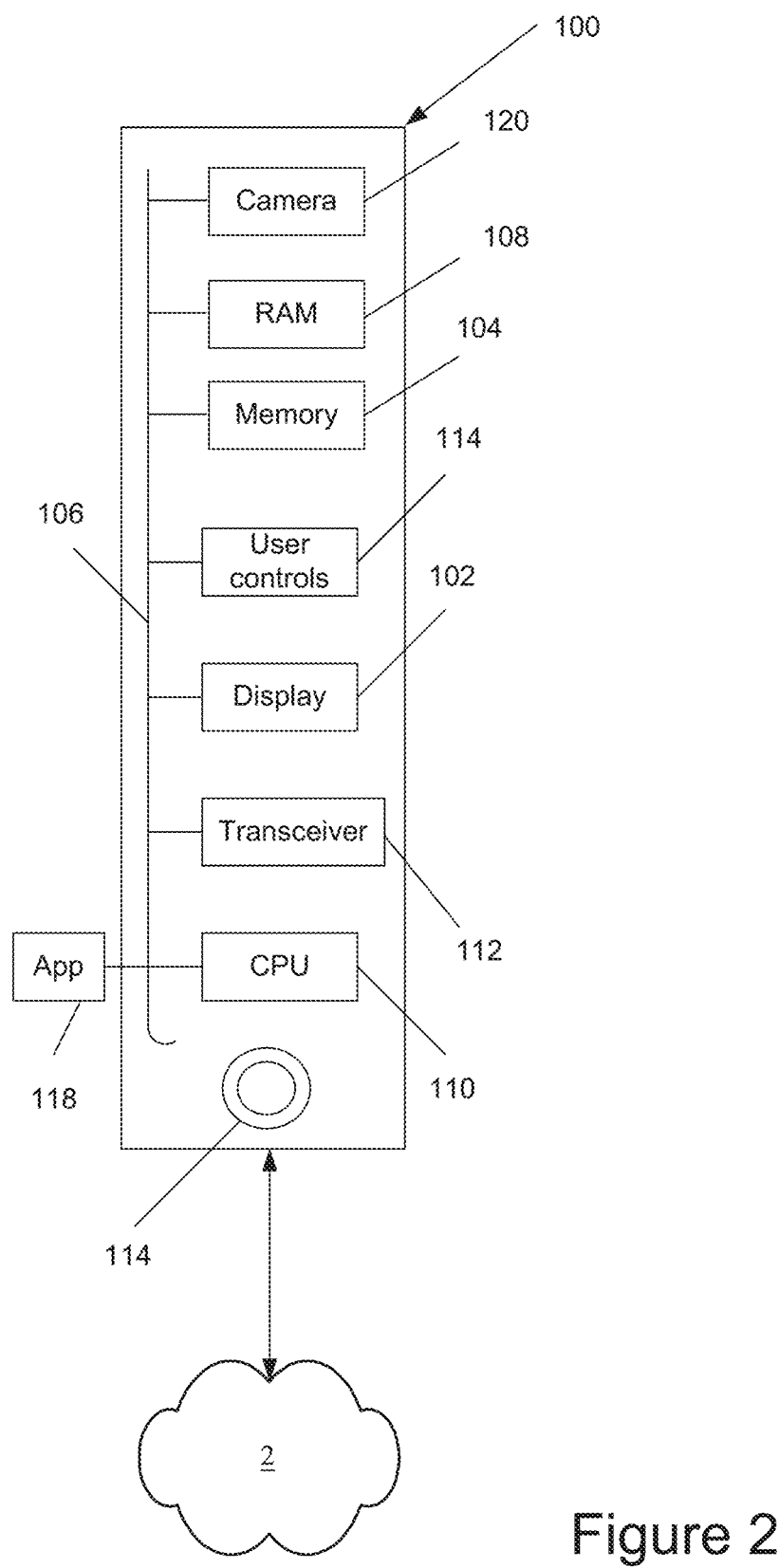
FIG. 2 is a schematic diagram showing components of a mobile computer device of the system shown in FIG. 1.

FIG. 2 is a block diagram showing an exemplary MCD 100 in which embodiments of the disclosure may be practiced. The MCD 100 may be a mobile computing device, such as a smartphone, a personal data assistant (PDA), a palm-top computer, multimedia Internet enabled cellular telephones, or a tablet computer such as one manufactured by Apple™, LG™, HTC™, Samsung™, or Motorola™, for example.

As shown in FIG. 2, the MCD 100 includes the following components in electronic communication via a bus 106:

(a) a display 102;

(b) non-volatile memory 104;

(c) random access memory ("RAM") 108;

(d) N processing components 110;

(e) a transceiver component 112 that includes N transceivers; and (f) user controls 114.

Although the components depicted in FIG. 2 represent physical components, FIG. 2 is not intended to be a hardware diagram. Thus many of the components depicted in FIG. 2 may be realized by common constructs or distributed among additional physical components. Moreover, it is certainly contemplated that other existing and yet-to-be developed physical components and architectures may be utilized to implement the functional components described with reference to FIG. 2.

The display 102 generally operates to provide a presentation of content to a user, and may be realized by any of a variety of displays (e.g., CRT, LCD, HDMI, micro-projector, and OLED displays).

In general, the non-transitory data storage 104 (also referred to as non-volatile memory) functions to store (e.g., persistently store) data and executable code including code that is associated with the functional components of application programs, including the Merchant Application (App) 118.

In some embodiments, for example, the non-volatile memory 104 includes bootloader code, modem software, operating system code, file system code, and code to facilitate the implementation of one or more portions of the Merchant App 118 as well as other components well known to those of ordinary skill in the art that are not depicted for simplicity.

In many implementations, the non-volatile memory 104 is realized by flash memory (e.g., NAND or ONENAND memory), but it is certainly contemplated that other memory types may be utilized as well. Although it may be possible to execute the code from the non-volatile memory 104, the executable code in the non-volatile memory 104 is typically loaded into RAM 108 and executed by one or more of the N processing components 110.

The N processing components 110 in connection with RAM 108 generally operate to execute the instructions stored in non-volatile memory 104 to effectuate the functional components. As one of ordinarily skill in the art will appreciate, the N processing components 110 may include a video processor, modem processor, DSP, graphics processing unit (GPU), and other processing components.

The transceiver component 112 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The transceiver components 112 are also adapted to effect contactless payments. For example, the transceiver components are able to effect contactless payment using Near-Field Communications (NFC) according to the EMV standard. Digital payment methods based on the EMV standard may include Apple Pay™, or MasterPass™, for example.

The camera component 120 includes a standard camera module communicating in a standard way with other components e.g. the user control 114, app 118, display 102, RAM 108, non-volatile memory 104 and any other components necessary to effect a process of capturing a digital image (or multiple digital images continuously for a video).

It should be recognized that FIG. 2 is merely exemplary and in one or more exemplary embodiments, the functions described herein may be implemented in hardware, software, firmware or any combination thereof. If implemented in software, the functions may be stored on or transmitted over as one or more instructions or code encoded on a non-transitory computer-readable medium 104. Non-transitory computer-readable media 104 may include both computer storage media and communication media, including any medium that facilitates transfer of a computer program from one place to another. A storage medium may be any available medium that can be accessed by a computer.

The operational steps for an example embodiment of the disclosure are described in further detail below.

Merchant Application 118

The interoperation of the components of system 10 is hereafter described by way of non-limiting example, with reference to the Merchant App 118 being executed on the merchant's MCD 100. The Merchant App 118 can be used with payment cards including credit cards, debit cards, store cards, or digital wallets. For ease of description, the Merchant App 118 is described below by way of reference to credit cards only. However, the Merchant App 118 and the system 10 can be used with any suitable payment card.

Figure 3:
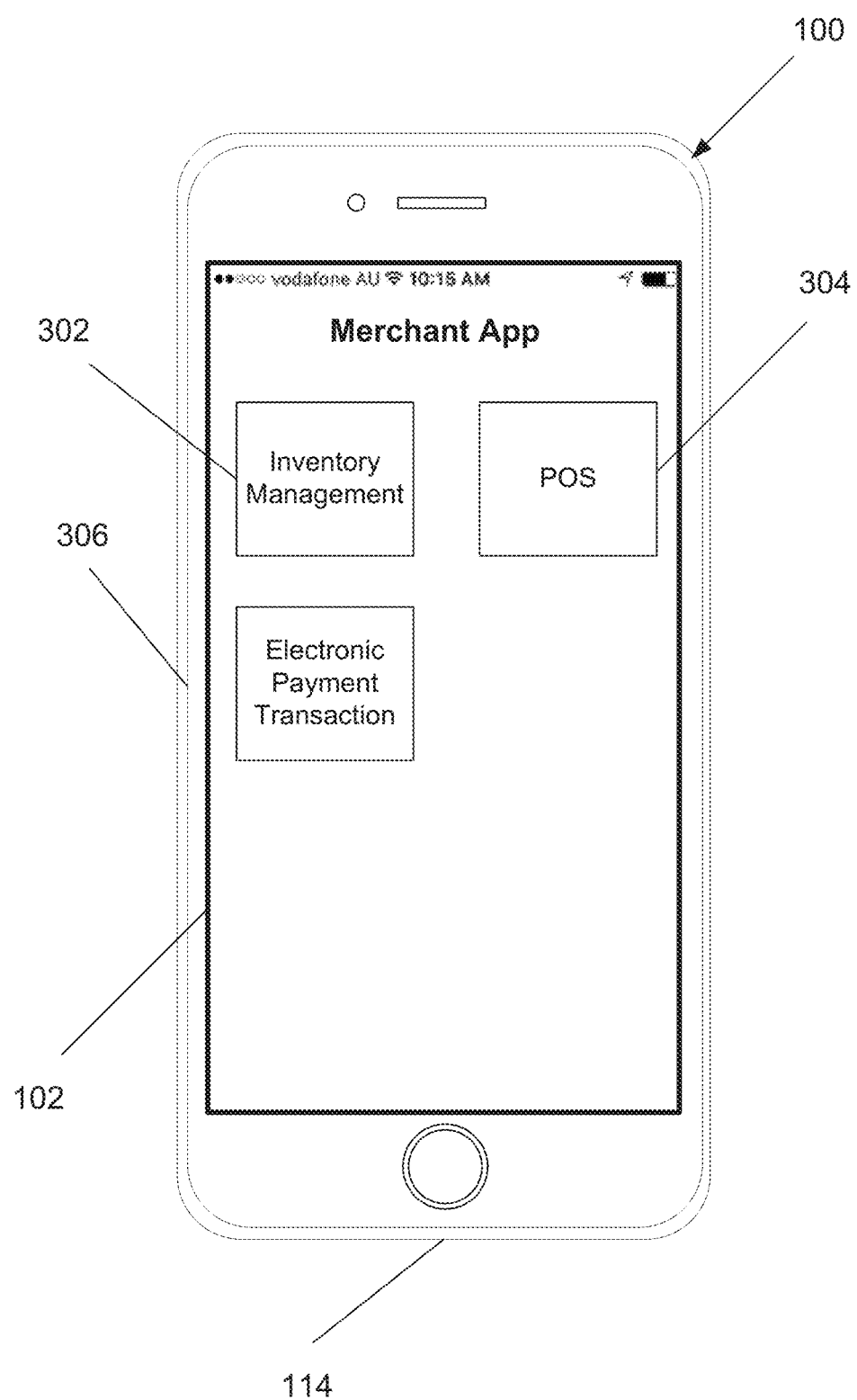
FIG. 3 is an image of an exemplary embodiment of the mobile computer device shown in FIG. 1.
Figure 4:
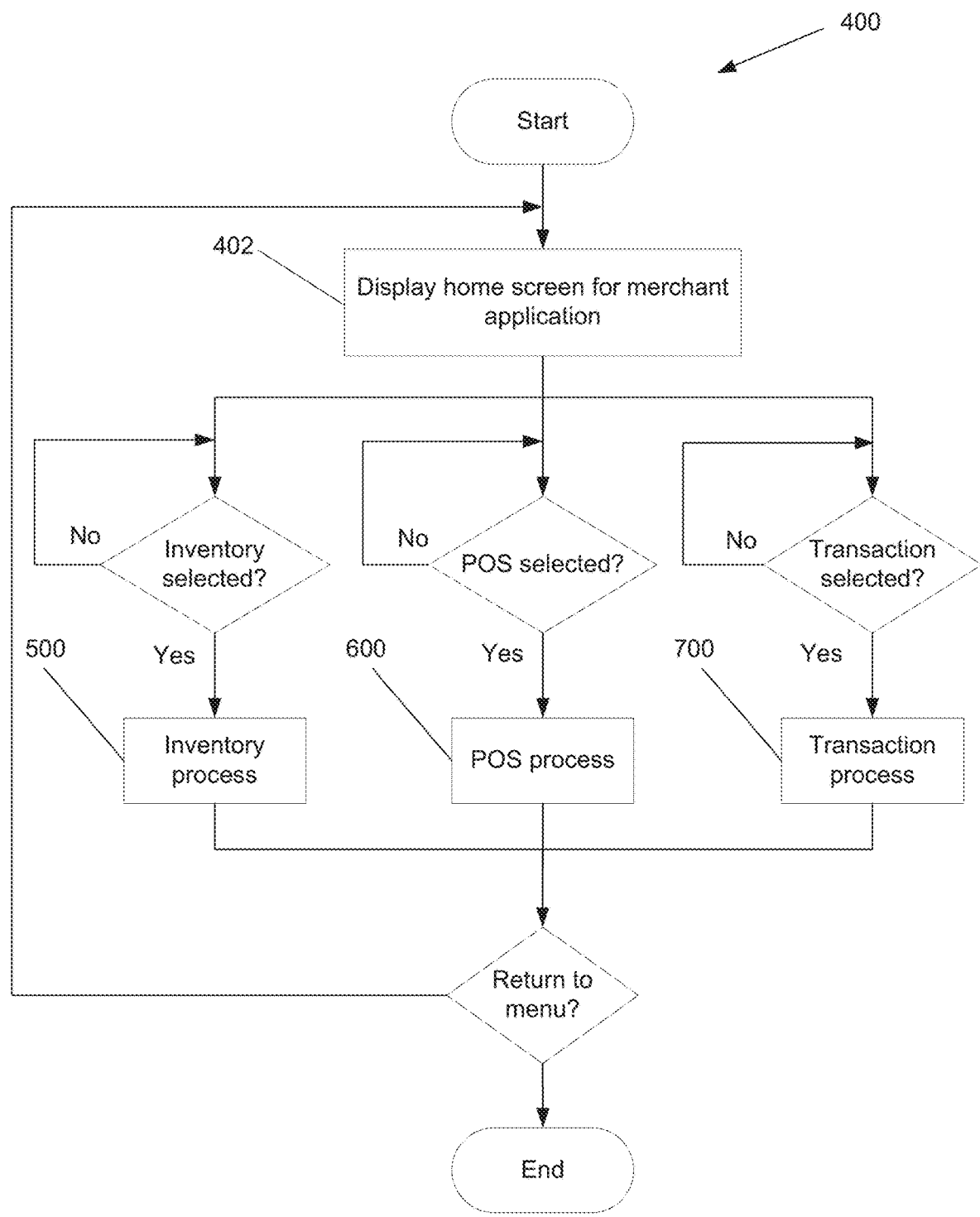
FIG. 4 is a flowchart diagram showing the steps performed by an application being executed by the mobile computer device of the system shown in FIG. 1.

On execution of the Merchant App icon, the Merchant App 118 performs the process 400 shown in FIG. 4 including, generating at step 402, the "Home" graphical user interface (GUI) shown in FIG. 3 on the display 102 of MCD 100. The "Home" GUI includes the following function buttons:

(a) Inventory Management 302;
(b) POS 304; and
(c) Electronic Payment Transaction 306.

The abovementioned processes are described below by way of non-limiting example.

Inventory Management Process 500

Figure 5A:
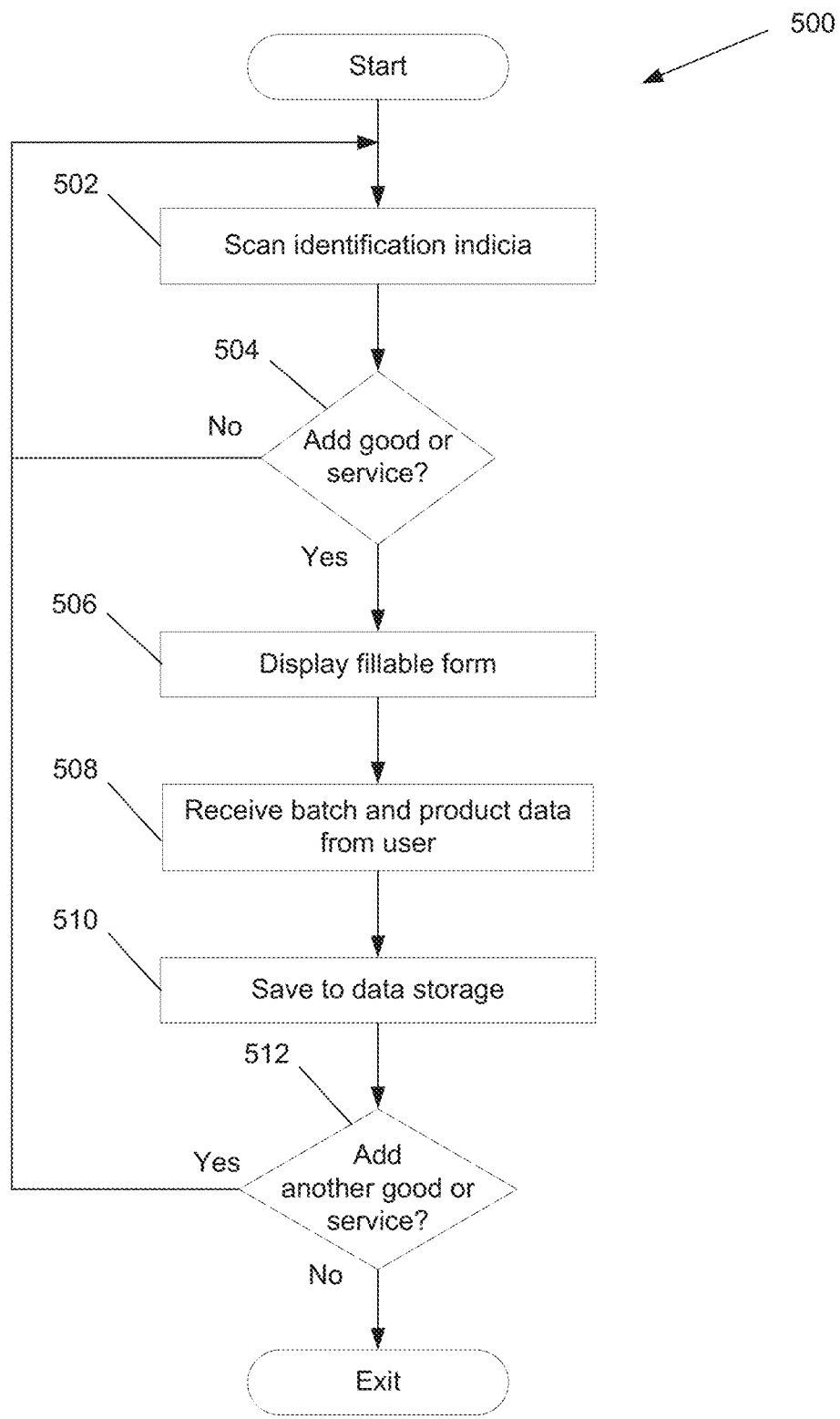
FIG. 5A is a flowchart diagram showing the inventory process in FIG. 4.

On execution of the Inventory Management function button 302 on the "Home" GUI 402, the Merchant App 118 executes the inventory management process 500 shown in FIG. 5A which calls up the services of the components of the system 10.

Figure 5B:
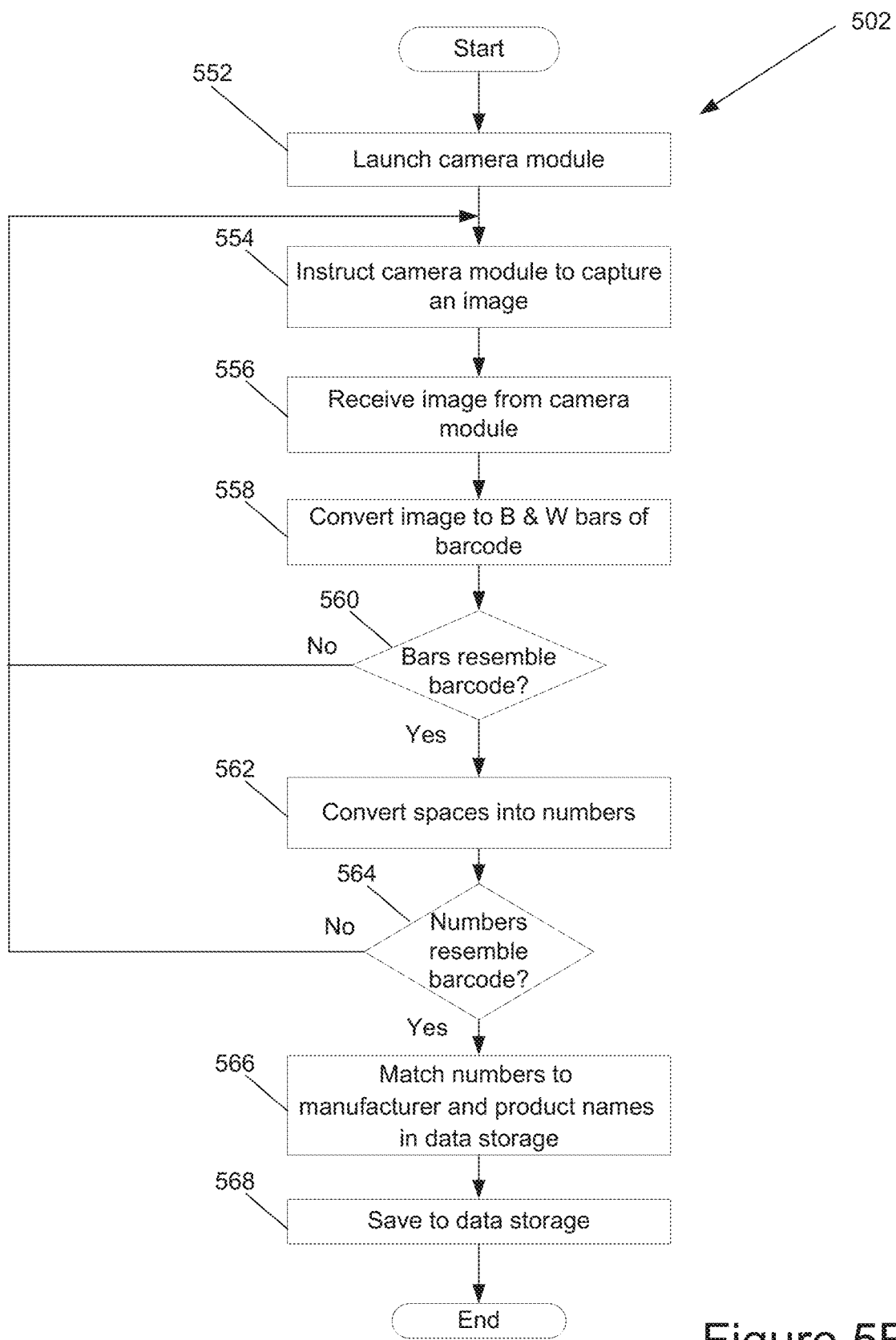
FIG. 5B is a flowchart diagram showing the scan identification indicia process in FIG. 5A.

The Merchant App 118 executes the identification indicia scanning process 502 shown in FIG. 5B. At step 552, the Merchant App 118 launches the camera module 120 on the MCD 100 and generates the camera's image on the display 102. The Merchant App 118 may generate a box within the image on the display 102 which indicates the ideal location for a successful identification of the identification indicia such as a barcode, QR code, or any other uniquely identifiable visual representation. For ease of description, the identification indicia in this embodiment of the disclosure is a Universal Product Code (UPC) barcode which is widely used internationally and follows a global specification. A UPC barcode typically consists of a unique string of numbers (Global Trade Item Number (GTIN)) which correspond to a company prefix and an item reference.

At step 554, the Merchant App 118 instructs the camera module 120 to capture an image which is received by the Merchant App 118 at step 556, and saved on the non-volatile memory 104 of the MCD 100. At step 558, the Merchant App 118 processes the saved image by first isolating the barcode and then separating the barcode into black and white bars. At step 560, the black and white bars are analyzed to see if they resemble a barcode. If the black and white bars do not resemble a barcode, the process loops back to perform step 554 again. If the black and white bars do resemble a barcode, the process continues on to step 562.

At step 562, the Merchant App 118 converts the black and white spaces into numbers. At step 564, the numbers are analyzed to determine if they resemble a typical UPC barcode numbers. If the numbers resemble a barcode, step 566 is performed, otherwise, the process loops back to perform step 554.

At step 566, the numbers representing a manufacturer code (company prefix) and a product code (item reference) are matched against a list of manufacturers and products in an inventory database and retrieved by Merchant App 118. The inventory database may be physically located on the non-volatile memory 104 of the MCD 100, a cloud server, or any other external server connected to network 2. For ease of description, this embodiment of the disclosure has the inventory database located on the non-volatile memory 104 of the MCD 100. In step 568, the processed image of the identification indicia and the matching manufacturer and product names are saved to the non-volatile memory 104 on the MCD 100 for further processing. At the conclusion of process 502, the Merchant App 118 executes step 504 in system 500.

If the identification indicia cannot be identified for reasons such as poor lightning or incomplete indicia, the barcode numbers (or any other uniquely identifiable alphanumeric series) can be entered manually. Alternatively, the good or service can be searched by product name using the Merchant App 118 in communication with the inventory database.

Upon successful scanning of the identification indicia, the Merchant App 118 processes step 504 which generates on the display 102 the following:
 (a) the identification indicia from step 568;
 (b) the matching manufacturer and product names from step 568; and
 (c) two function buttons showing the text:
  (i) "Add good or service to inventory database"; and
  (ii) "Discard and rescan identification indicia".

If a user selects "Add good or service to inventory database", then the Merchant App 118 executes step 506, which retrieves and generates for display 112 a user input such as a fillable form requesting for information regarding the good or service. As an example, relevant information may be the quantity of goods to be entered into the inventory database, batch information (e.g. expiration date), supplier information, and retail price.

At the end of the user input, the Merchant App 118 generates for display 112 on MCD 100 a function button with the text "Save good or service to inventory database". When a user selects the function button, the Merchant App 118 executes step 508 whereby it receives the entered user information (good or service information). Step 510 sends the user information to the inventory database to be stored.

Upon successful saving of a good or service to the inventory database, the Merchant App 118 executes step 512 which generates two function buttons on display 102:
 (a) "Add another good or service"; and
 (b) "Quit to main menu".

The Merchant App 118 upon receipt of user input (a) above will loop the process 500 back to step 502. Alternatively, the Merchant App 118 upon receipt of user input (b) will bring up the "Home" GUI 402 on the display 102.

The Merchant App 118 may have additional inventory management functions such as modifying the quantity of goods in the inventory database, sending reminders for goods that are low in quantity in the inventory database, or automatically sending purchase orders to a supplier for those goods.

POS Process 600

On execution of the POS function button 304 on the "Home" GUI 402, the Merchant App 118 executes the POS process 600 shown in FIG. 6A which calls up the services of the components of the system 10.

Figure 6B:
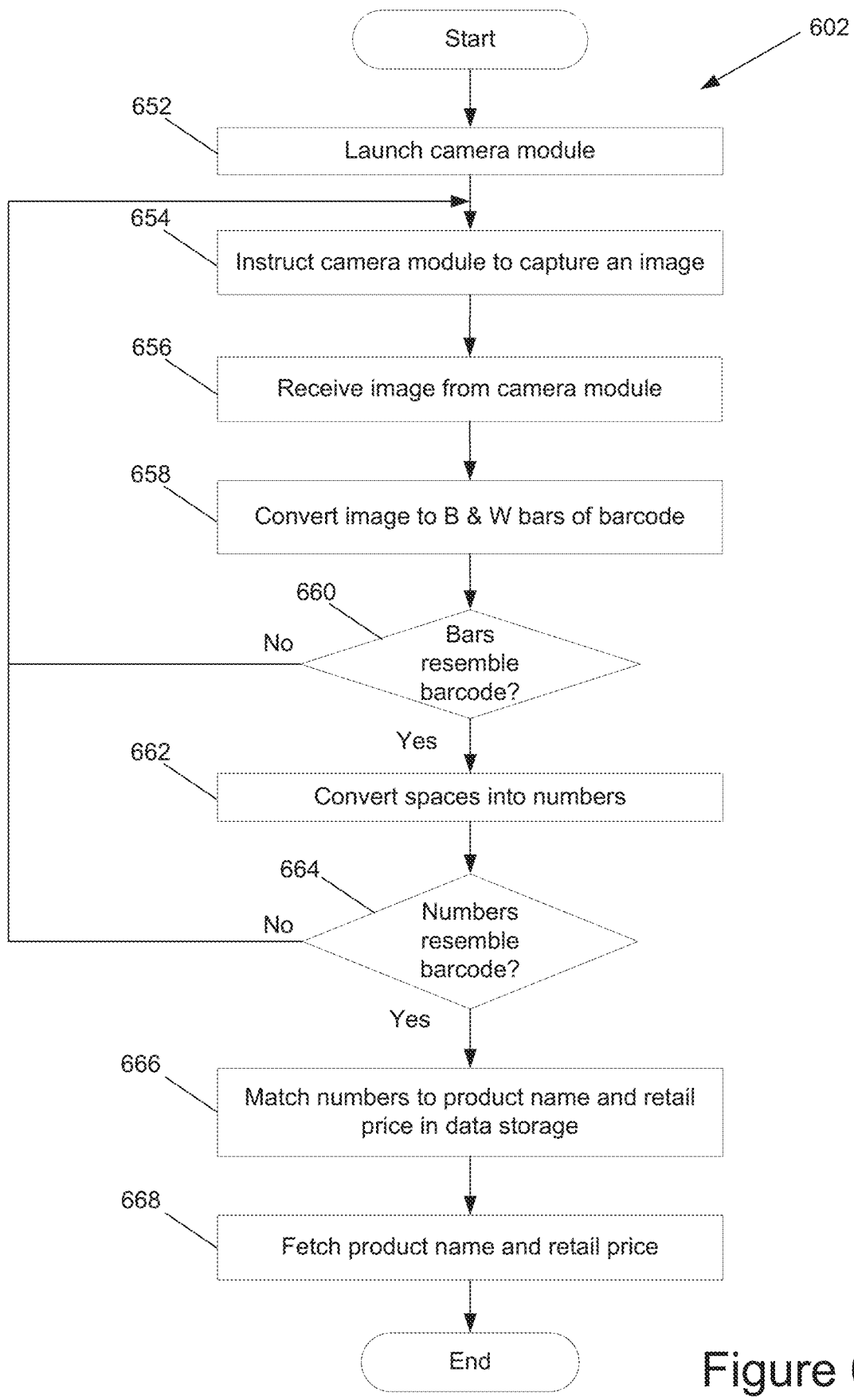
FIG. 6B is a flowchart diagram showing the scan identification indicia process in FIG. 6A.

The Merchant App 118 executes the identification indicia scanning process 602 shown in FIG. 6B. At step 652, the Merchant App 118 launches the camera module 120 on the MCD 100 and generates the camera's image on the display 102. The Merchant App 118 may generate a box within the image on the display 102 which indicates the ideal location for a successful identification of the identification indicia such as a barcode, QR code, or any other uniquely identifiable visual representation. For ease of description, the identification indicia in this embodiment of the disclosure is a barcode.

At step 654, the Merchant App 118 instructs the camera module 120 to capture an image which is then received by the Merchant App 118 at step 656, and saved on the non-volatile memory 104 of the MCD 100. At step 658, the Merchant App 118 processes the saved image by first isolating to barcode and then separating it into black and white bars. At step 660, the black and white bars are analyzed to see if they resemble a barcode. If the black and white bars do not resemble a barcode, the process loops back to perform step 654. If the black and white bars do resemble a barcode, the process proceeds on to step 662.

At step 662, the app converts the black and white spaces into numbers. At step 664, the numbers are checked to see if they resemble a typical UPC barcode. If the numbers resemble a barcode, step 666 is then performed, otherwise, the process loops back to perform step 654.

At step 666, the numbers representing a manufacturer code (company prefix) and a product code (item reference) are matched against a list of manufacturers and products in the inventory database. In step 668, the Merchant App 118 retrieves the matched product name and retail price from the inventory database and these are saved to the non-volatile memory 104 of the MCD 100 for further processing. At the conclusion of process 602, the Merchant App 118 executes step 604 in system 600.

If the identification indicia cannot be identified, for reasons such as poor lightning or incomplete indicia, the barcode numbers (or any other uniquely identifiable alphanumeric series) can be entered manually. Alternatively, the good or service can be searched by product name using the Merchant App 118 in communication with the inventory database.

Upon successful identification of the good or service, the Merchant App 118 performs step 604 which adds the matching product name and retail price of the good or service to a transaction list saved on the non-volatile memory 104 of MCD 100. Step 606 generates on the display 102 the product name and retail price from the non-volatile memory 104 from step 668. Step 608 generates on the display 102, three function buttons showing the text:
 (a) "Increase quantity of good or service";
 (b) "Add additional good or service to transaction list"; and
 (b) "No more items to be scanned. Generate total".

The default quantity of items to be added to the transaction list is one item, but if multiple items are to be entered, a user may select function button (a). Selecting this button initiates the Merchant App 118 to generate for display a user input and upon receipt of the user input, increases the quantity of the good or service in the transaction list to the entered user input. If a user selects function button (b), "Add additional good or service to transaction list", then the Merchant App 118 loops back to step 602. If a user selects function button (c), "No more items to be scanned. Generate total", the Merchant App 118 performs step 610 which retrieves the transaction list from the non-volatile memory 104 and calculates the total transaction cost by adding the retail prices of the items in the transaction list. In step 612, the Merchant App 118 generates for display 102 the total transaction cost to be shown to the customer for verification.

At step 616, the Merchant App 118 generates for display the total transaction cost and two function buttons on display 102 with the text:
(a) "Amend transaction cost"; and
(b) "Total transaction cost is correct".

At step 614, The Merchant App 118 upon receipt of function button (a) above generates for display 102 the option for the user to amend the transaction list. For example, options to amend the transaction include modifying the quantity of a good or service on the transaction list, modify the total transaction cost or apply a discount (e.g. 10%) to the entire bill. After step 614, the process loops back to step 610. Alternatively, the Merchant App 118 upon receipt of function button (b) ends the POS transaction process 600 and invokes the electronic payment transaction process 700.

Electronic Payment Transaction Process 700

Figure 7A:
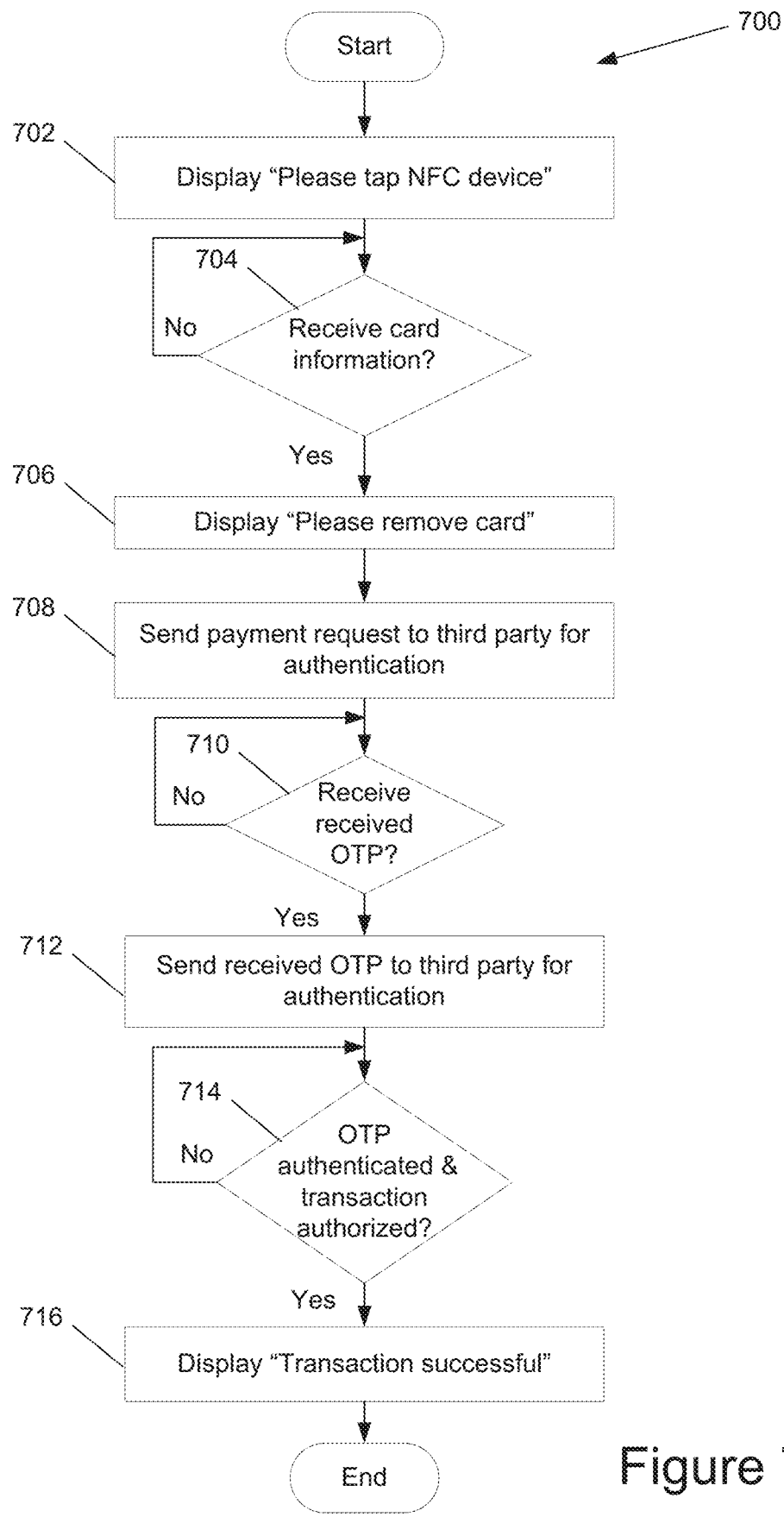
FIG. 7A is a flowchart diagram showing the transaction process in FIG. 4.
Figure 7B:
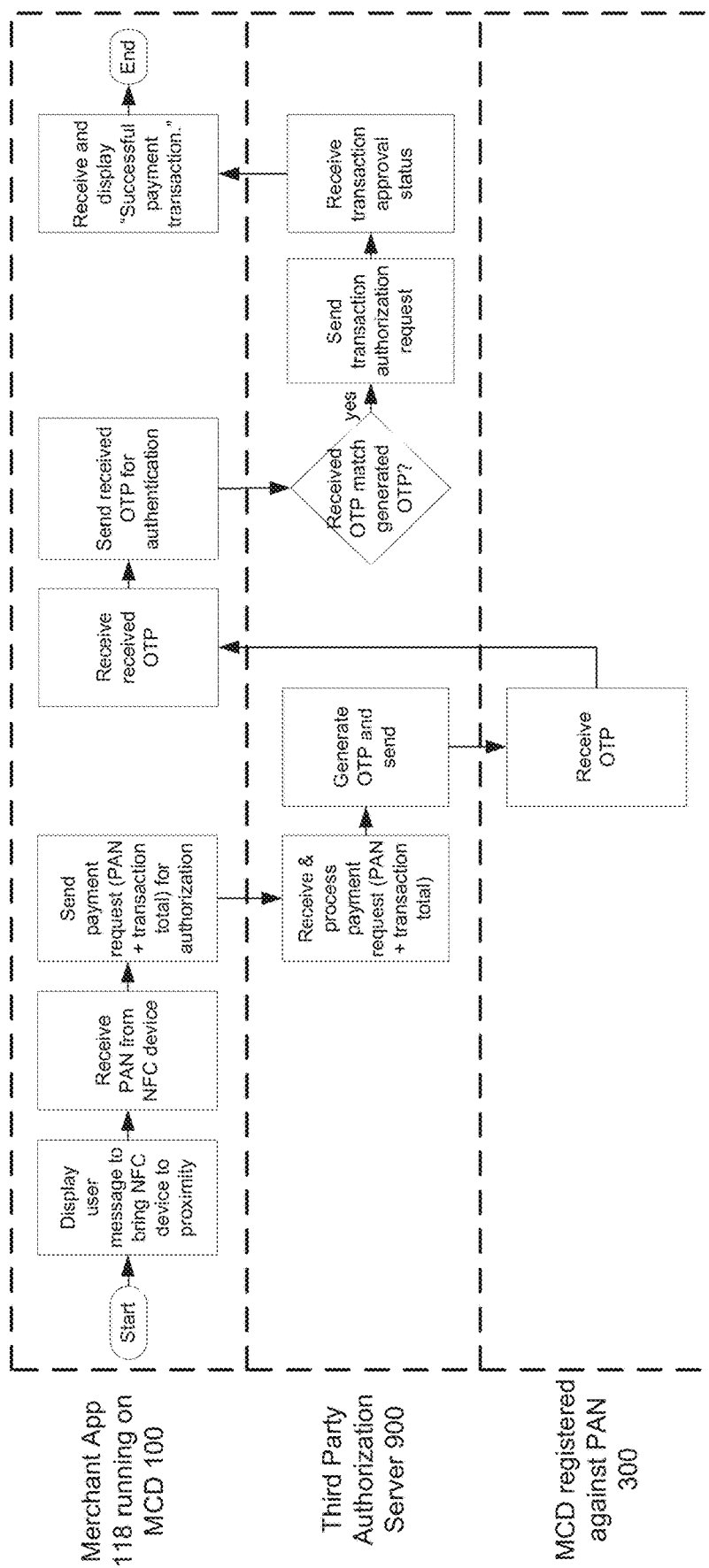
FIG. 7B is a flowchart diagram showing the interoperation of the components of the system to execute the transaction process in FIG. 7A.

On execution of the Electronic Payment Transaction function button 306 on the "Home" GUI 402 or upon verification of the total transaction cost from step 616 of process 600, the Merchant App 118 executes the transaction process 700 shown in FIG. 7A which invokes the services of the components of the system 10 in the manner shown in FIG. 7B.

At step 702, the Merchant App 118 generates for display 102 the user message "Please tap card" which indicates to the purchaser to bring his or her near-field communication (NFC) device into proximity with the merchant's MCD 100 for exchanging data therebetween. The exchanged data may include the primary account number (PAN) associated with a payment card such as a debit or credit card, or a payment token which consists of or includes a surrogate value for the PAN. A NFC device may be a NFC-enabled payment card or a NFC-enabled MCD having a digital wallet application executing or executable thereon (e.g. Apple Pay™ or MasterPass™).

At step 704, the Merchant App 118 activates the NFC reader on the MCD 100 to receive PAN information from the NFC device. The PAN and any other received data are secured by means of tokenization or encryption prior to any storing or processing processes. Payment credentials used by the Merchant App 118 and any of its processes may be stored on the MCD 100 secure element (SE) and segregated by limiting other applications or system tools from accessing or using the SE. Alternatively, the payment credentials may be stored in a secure shared repository which is part of a host card emulation (HCE) system.

Upon successful receipt of PAN information (or a payment token as described above), at step 706, the Merchant App 118 generates for display 102 on the MCD 100 the user message "Please remove card". Additional indications of a successful flow of data include playing a "beep" sound or switching on a green LED light. The payment request data (including total transaction cost and PAN or payment token) may be encrypted as part of a unique one-time cryptogram before being transmitted to a third party for authorization. At step 708, the Merchant App 118 sends the encrypted payment request data to the third party authorization server 900 as a first stage of an authorization request. The third party authorization server may be a mobile application server, for example.

Upon receipt of the payment request, the third party authorization server 900 generates an issued one time password (OTP) and sends it to a mobile device 300 registered against the PAN or payment token. The communication of the OTP could be in the form of a short message service (SMS) message or an email, via an SMS gateway or an email gateway as appropriate. The purchaser, upon receipt of the OTP on the mobile device 300 communicates the OTP to the merchant's MCD 100.

At step 710, the Merchant App 118 receives the received OTP by user input. The Merchant App 118 then performs step 712 and sends the received OTP to the third party authorization server 900 for authentication. The third party authentication process involves the step of the third party authorization server 900 receiving the purchaser's received OTP and comparing it with the generated OTP. If the two OTPs are an exact match, the third party authorization server 900 generates a transaction authorization request message, for example an ISO 8583-formatted transaction authorization request, using the payment request data (which may include merchant identification data, for example) and sends the transaction authorization request message to an acquirer system (not shown) for routing to a payment network in known fashion. If the transaction is approved, a transaction approval message is received at the third party authorization server 900, which then transmits an approval message to the MCD 100. At step 714, the Merchant App 118 receives the transaction approval and at step 716 generates for display 102, "Successful payment transaction".

The Merchant App 118 may send a request to issue a receipt for the successful transaction. This may be a request to the third party for a digital receipt to be communicated to the purchaser (for example by email or SMS). Alternatively, the Merchant App 118 may generate (or receive from the third party) and send the receipt to be printed by a printer connected to the MCD 100 by network 2.

Many modifications will be apparent to those skilled in the art without departing from the scope of the present disclosure.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

What is claimed is:

1. An authorization server for processing electronic payment requests received from a merchant, the authorization server including one or more computer processors programmed to:
   (a) receive, from a hand-held merchant's mobile computer device in near-field electronic communication with a hand-held mobile computer device of a purchaser, payment request data comprising payment credentials of the purchaser, the payment credentials including a primary account number (PAN) or a payment token, wherein the merchant's mobile computer device comprises:
      a display;

a non-transitory storage device;
a camera to read indicia associated with products for sale by the merchant; and
at least one processor configured to execute program instructions stored in the storage device, wherein the instructions comprise a consolidated merchant application which allows the merchant to interact in with the purchaser via near-field electronic communication with the hand-held mobile computer device of the purchaser, the merchant application when executed causes the hand-held merchant's computer device to:
store, in an inventory database accessible by the merchant's mobile computer device, product information associated with the products for sale by the merchant, the product information comprising at least quantity of goods, supplier information and retail price;
identify a product based on indicia associated with the product that is read by the camera;
generate, on the display, based on the product information stored in the inventory database, a name of each of the products to be purchased and a total price of the products to be paid;
receive, from the purchaser's mobile computer device, payment data;
generate, on the display, an indication to bring the purchaser's mobile computer device into proximity with the merchant's mobile computer device;
(b) generate a one time password (OTP);
(c) send the generated OTP to the mobile computer device of the purchaser registered in association with the PAN or the payment token;
(d) receive a received OTP from the merchant's mobile computer device, wherein the received OTP is received from the purchaser;
(e) match the received OTP against the generated OTP; and
(f) if the received OTP matches the generated OTP, generate a transaction authorization request based on the payment request data.

2. The authorization server according to claim 1, wherein the one or more computer servers are programmed to send the generated OTP to a mobile device registered in association with the PAN or the payment token by one of a short message service (SMS) and an e-mail.

3. The authorization server according to claim 1, wherein the payment request data is encrypted.

4. The authorization server according to claim 1, wherein, prior to the send of the generated OTP, the one or more computer processors are programmed to retrieve, from computer readable data storage, data identifying the mobile device registered in association with the PAN or payment token.

5. A method for processing electronic payment requests, received from a merchant, on an authorization server, the method including, on one or more computer processors of the authorization server:
(a) receiving, by the authorization server, from a hand-held merchant's mobile computer device in near-field electronic communication with a hand-held mobile computer device of a purchaser, payment request data comprising payment credentials of the purchaser, the payment credentials comprising a primary account number (PAN) or a payment token, wherein at a merchant's mobile computer device that interacts with the purchase via near-field electronic communication with the hand-held mobile computer device of the purchaser:
storing, by the merchant's mobile computer device, in an inventory database accessible by the merchant's mobile computer device, product information associated with the products for sale by the merchant, the product information comprising at least quantity of goods, supplier information and retail price;
identifying, by the merchant's mobile computer device, a product based on indicia associated with the product that is read by a camera of the merchant's mobile computer device;
generating, by the merchant's mobile computer device, on a display of the merchant's mobile computer device, based on the product information stored in the inventory database, a name of each of the products to be purchased and a total price of the products to be paid;
receiving, by the merchant's mobile computer device, from the purchaser's mobile computer device, payment data;
generating, by the merchant's mobile computer device, on the display, an indication to bring the purchaser's mobile computer device into proximity with the merchant's mobile computer device; and
(b) generating, by the authorization server, a one time password (OTP);
(c) sending, by the authorization server, the generated OTP to a mobile device registered in association with the PAN or the payment token;
(d) receiving, by the authorization server, a received OTP from the merchant's mobile computer device, wherein the received OTP is received from the purchaser;
(e) comparing, by the authorization server, the received OTP against the generated OTP; and
(f) responsive to the comparing, generating, by the authorization server, a transaction authorization request based on the payment request data.

6. The method according to claim 5, wherein sending the generated OTP a mobile device registered in association with the PAN or the payment token comprises sending by one of a short message service (SMS) and an e-mail.

7. The method according to claim 5, wherein the payment request data is encrypted.

8. The method according to claim 5, wherein prior to sending the generated OTP, the authorization server retrieves from computer readable data storage, data identifying the mobile device registered in association with the PAN or payment token.

9. The method according to claim 5, wherein the comparing comprises:
determining whether there is a match between the generated OTP and the received OTP.

10. The method according to claim 5, the method further comprising:
transmitting the transaction authorization request to an acquirer system to route to a payment network;
receiving an approval response message responsive to the transaction authorization request; and
transmitting an indication of the approval response message to the merchant's mobile computer device.

11. A non-transitory computer-readable medium that stores first instructions, the first instructions, when executed by an authorization server, program the authorization server to:
(a) receive, from a hand-held merchant's mobile computer device in near-field electronic communication with a hand-held mobile computer device of a purchaser, payment request data comprising payment credentials of the purchaser, the payment credentials including a primary account number (PAN) or a payment token (b) generate a one time password (OTP);

(c) send the generated OTP to the mobile computer device of the purchaser registered in association with the PAN or the payment token;

(d) receive a received OTP from the merchant's mobile computer device, wherein the received OTP is received from the purchaser, wherein the received OTP is received from the purchaser;

(e) match the received OTP against the generated OTP; and (f) if the received OTP matches the generated OTP, generate a transaction authorization request based on the payment request data, and wherein the computer-readable medium further stores second instructions that, when executed by a hand-held merchant's mobile computer device, programs the merchant's mobile computer device to:

store, in an inventory database accessible by the merchant's mobile computer device, product information associated with the products for sale by the merchant, the product information comprising at least quantity of goods, supplier information and retail price;

identify a product based on indicia associated with the product that is read by a camera of the merchant's mobile computer device;

generate, on a display of the merchant's mobile computer device, based on the product information stored in the inventory database, a name of each of the products to be purchased and a total price of the products to be paid;

receive, by the merchant's mobile computer device, from the purchaser's mobile computer device, payment data; and generate, on the display, an indication to bring the purchaser's mobile computer device into proximity with the merchant's mobile computer device.

12. The computer-readable medium of claim 11, wherein the first instructions, when executed by the authorization server, further program the authorization server to send the generated OTP to a mobile device registered in association with the PAN or the payment token by one of a short message service (SMS) and an e-mail.

13. The computer-readable medium of claim 11, wherein the payment request data is encrypted.

14. The computer-readable medium of claim 11, wherein the first instructions, when executed by the authorization server, further program the authorization server to:

prior to the send of the generated OTP, from computer readable data storage, data identifying the mobile device registered in association with the PAN or payment token.

* * * * *